United States Patent
Taketomi

(10) Patent No.: US 7,512,253 B2
(45) Date of Patent: Mar. 31, 2009

(54) METHOD OF DIGITIZING GRAPHIC INFORMATION

(76) Inventor: Chieko Taketomi, 29-5, Okusawa 2-Chome, Setagaya-ku Tokyo (JP)

( * ) Notice: Subject to any disclaimer, the term of this patent is extended or adjusted under 35 U.S.C. 154(b) by 595 days.

(21) Appl. No.: 10/847,424

(22) Filed: May 17, 2004

(65) Prior Publication Data
US 2005/0013468 A1     Jan. 20, 2005

(30) Foreign Application Priority Data
Oct. 29, 2001 (JP) .............................. 2001-331737
May 16, 2003 (JP) .............................. 2003-141528

(51) Int. Cl.
*G06T 11/00* (2006.01)
(52) U.S. Cl. ..................................... 382/113
(58) Field of Classification Search ................. 382/113
See application file for complete search history.

(56) References Cited

U.S. PATENT DOCUMENTS

| | | | | |
|---|---|---|---|---|
| 3,930,237 A * | 12/1975 | Villers | ......................... | 715/234 |
| 5,050,222 A * | 9/1991 | Lee | ............................. | 382/176 |
| 5,530,947 A * | 6/1996 | Takasaki et al. | ............. | 345/619 |
| 5,963,966 A * | 10/1999 | Mitchell et al. | ............. | 715/513 |
| 5,995,659 A * | 11/1999 | Chakraborty et al. | ....... | 382/176 |
| 6,134,338 A * | 10/2000 | Solberg et al. | .............. | 382/113 |
| 6,735,347 B1 * | 5/2004 | Bates et al. | ................. | 382/282 |
| 6,782,144 B2 * | 8/2004 | Bellavita et al. | ............ | 382/310 |
| 6,972,865 B1 * | 12/2005 | Muramatsu | ................. | 358/1.2 |
| 2002/0161796 A1 * | 10/2002 | Sylthe | ........................ | 707/500 |
| 2002/0191848 A1 * | 12/2002 | Boose et al. | ................ | 382/181 |

OTHER PUBLICATIONS

Eastman C.M., Computer Graphics and Applications, IEEE. Publication Date: Sep. 1990 vol. 10, Issue: 5. On pp. 68-80.*
Eastman C.M., Computer Graphics and Applications, IEEE. Publication Date: Sep. 1990 vol. 10, Issue: 5. on pp. 68-80.*

* cited by examiner

*Primary Examiner*—Jingge Wu
*Assistant Examiner*—Max Shikhman
(74) *Attorney, Agent, or Firm*—Rockey, Depke & Lyons, LLC; Robert J. Depke

(57) ABSTRACT

A method of digitizing graphic information includes the steps of reading monochrome graphic information by using a black-and-white scanner to input raster data; sorting the raster data into text data and vector data; storing the sorted vector data in element layers for every predetermined element; deleting only the raster data of alphabetic information that has undergone the text conversion; converting the raster data excluding the text data into the vector data; and storing the converted vector data in basic layers for every group.

4 Claims, 1 Drawing Sheet

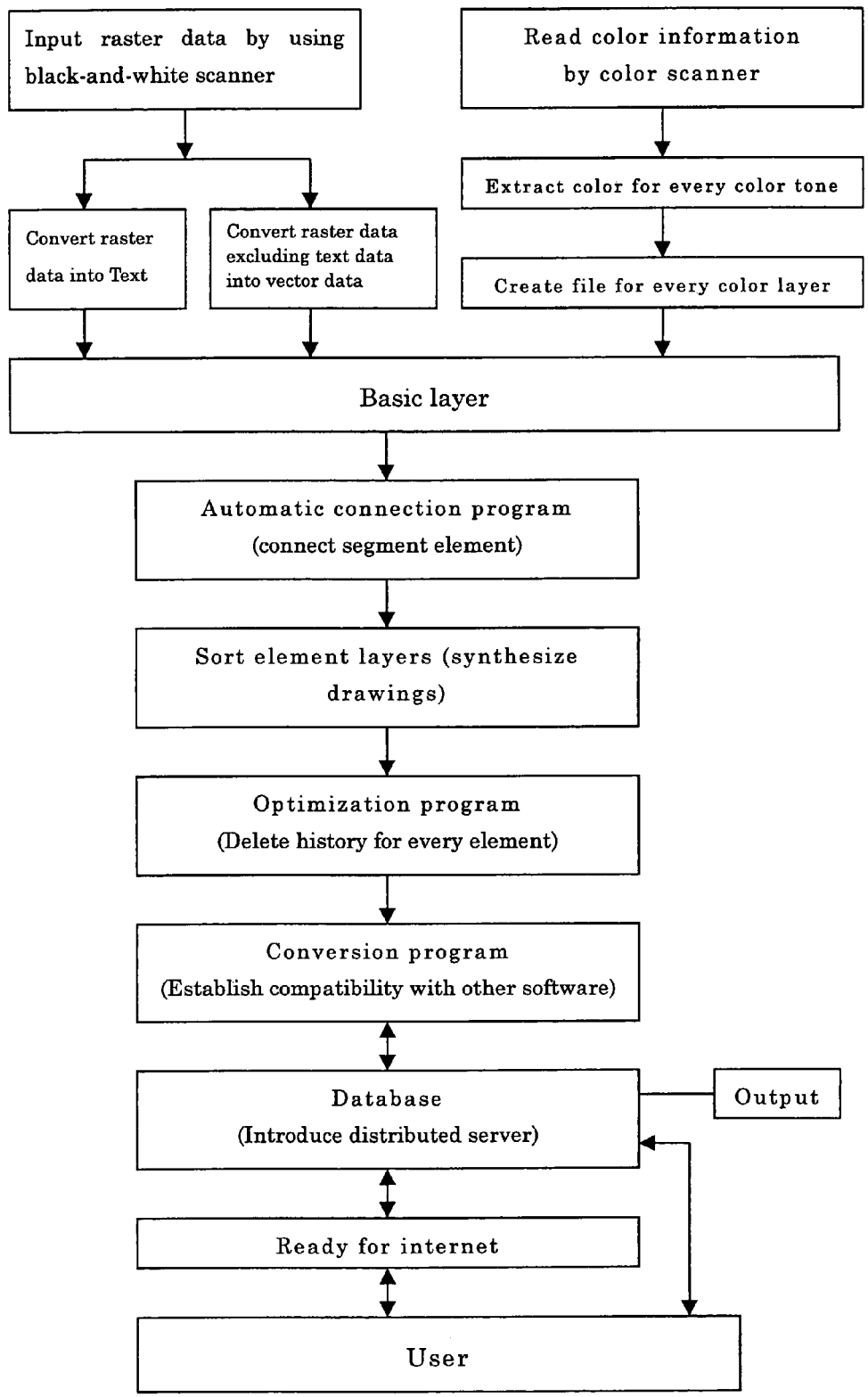

METHOD OF DIGITIZING GRAPHIC INFORMATION

Applicant's Japanese application, Publication No. JP 2003-141528 published May 16, 2003 is incorporated herein by reference.

BACKGROUND OF THE INVENTION

1. Field of the Invention

The present invention relates to a method of vectorizing a lot of digital data converted from analog data such as graphic information by using a computer, that is, a method of converting raster data into vector data, and to a system prepared for computer-aided logistics. support (CALS). Specifically, the present invention relates to a method of editing and converting raster data and vector data of a map or the like including buildings, sites, roads, parks, contours, rivers, fields, and letters, which is used for construction, a cadastral survey, and so on.

2. Description of the Related Art

Hitherto, only two-value (black and white) raster data has been converted into vector data. In addition, upon conversion of the two-value raster data into vector data, there is no known technique of correcting distortion of the raster data. Accordingly, graphics have been created only by using computer-aided design (CAD) software and tracing has only been performed by using a digitizer. For a cadastral survey or the like, an enormous amount of information must be processed by hand and, therefore, the cadastral survey has been difficult to perform because it requires a lot of work and time and also requires special knowledge.

Since raster data cannot be sorted with known techniques, inaccurate and meaningless crosslines are created even when two-value raster data is converted into vector data and, therefore, it is necessary to process the raster data by manual tracing.

It is extremely difficult to internationally standardize CAD data or the like, which has been created by using programs installed on different hardware conforming to various standards.

In addition, the amount of raster data is enormous and it is impossible to communicate such data over the Internet.

Since the CAD data processed by known techniques is not standardized, it is difficult to establish compatibility between a variety of CAD data created by using programs installed on different hardware.

SUMMARY OF THE INVENTION

Accordingly, it is an object of the present invention to provide a method of performing batch conversion of raster data into vector data. The raster data is provided by reading graphic information, particularly, a map and a hand-written drawing by a scanner and correcting distortion.

It is another object of the present invention to provide a method of processing graphic information, particularly, a map and a hand-written drawing and reducing the amount of data to generate Internet-ready vector data.

It is still another object of the present invention to provide a method of processing drawings, particularly, a map and a hand-written drawing to generate vector data that can be used in a CALS system conforming to ISO STEP/AP202.

It is still another object of the present invention to provide a method of reprocessing known graphic information, particularly, CAD data of a map and a hand-written drawing to generate vector data that can be used in a CALS system conforming to ISO STEP/AP202.

The present invention provides, in its first aspect, a method of digitizing graphic information including the steps of reading monochrome graphic information by using a black-and-white scanner to input raster data; sorting the raster data into text data and vector data; storing the sorted vector data in element layers for every predetermined element; deleting only the raster data of alphabetic information that has undergone the text conversion; converting the raster data excluding the text data into the vector data; and storing the converted vector data in basic layers for every group.

The present invention provides, in its second aspect, a method of digitizing graphic information including the steps of reading color graphic information by using a color scanner to input raster data; performing color extraction from the read raster data for every color tone; sorting the raster data into files for every color layer; converting the raster data in the sorted files into two-color data for every color tone; deleting all colors other than the two colors in the sorted files; and storing the files for every color layer in basic layers.

Difficulty in converting raster data into vector data with known techniques is cleared up by sorting components in graphic information data in accordance with a predetermined rule and processing the sorted components for every element according to the present invention.

The present invention provides, in its third aspect, a method of digitizing graphic information including the steps of displaying a basic layer in a screen; converting raster data of alphabetic information into text data; deleting the raster data of the alphabetic information after the text conversion; performing batch conversion into short vectors for the raster data excluding the alphabetic information; automatically connecting the short vectors that are in contact with coordinate axes X and Y; storing the automatically-connected polylines in element layers for every their elevation; and arranging the layers for every element and automatically connecting incomplete free curves or straight-lines between two points away from each other to form the polylines.

The present invention provides, in its fourth aspect, a method of digitizing graphic information including the steps of displaying a basic layer in a screen; converting raster data of alphabetic information into text data; deleting the raster data of the alphabetic information after the text conversion; performing batch segmentation for the raster data excluding the alphabetic information; transforming the segments into polygons, that is, into closed loops on the basic layer for every element; sequentially sorting the elements transformed into the closed loops into specified element layers; and transforming the segments that are not to be or cannot be transformed into the polygons into polylines for every element.

BRIEF DESCRIPTION OF THE DRAWINGS

The drawing is a flowchart illustrating a data editing process according to the present invention.

DESCRIPTION OF THE PREFERRED EMBODIMENTS

A method of digitizing graphic information according to an embodiment of the present invention will now be described with reference to the attached flowchart.

According to the present invention, layers programmed in CAD software are used to set a plurality of layers including basic layers, element layers, and graphic layers. A graphic frame is provided on each of the basic layers, and raster data that has undergone distortion correction and scaling setting is pasted on the basic layer with respect to the origin of coordinate axes (X=0, Y=0). Vector data having the same graphic frame and coordinate value, which is displayed in one screen, is sorted for every layer.

The layers are programmed into 16 groups, each group being programmed into 256 layers, so that it is possible to set the total of 4,096 layers.

According to the embodiment of the present invention, I. a graphic frame; II. a grid; III. raster data that has undergone distortion correction, in which the graphic frame is written; IV. short vectors; V. text data; VI. circles and/or arcs; and VII. straight lines are pasted on the corresponding basic layers.

In order to process monochrome graphic information, first, the monochrome graphic information is read by using a black-and-white scanner to input binary raster data.

Next, a directory is created in the hard disk in a personal computer (PC). The coordinate axes X and Y of vector data are input in the created directory, and the virtual coordinate axes X and Y of the vector data are input in the raster data. The coordinate axes of the raster data are adjusted to the coordinate axes of the basic layers to perform distortion correction.

In order to sort the binary raster data into text data and the vector data, text attributes, such as the size and angle of a letter, are attached to the rasterized alphabetic information. The rasterized alphabetic information having the attached text attributes is stored in predetermined element layers.

The raster data of the alphabetic information that has undergone the text conversion is deleted.

The raster data excluding the text data undergoes vector-conversion into basic elements (segments, circles, and arcs) and is stored in the basic layers.

Separating the text data from the binary raster data and converting the separated raster data into the vector data allows the vector data excluding the alphabetic information to be subject to batch conversion.

In order to process color information including images, pictures, hand-written drawings, and maps, first, the color information is read by using a color scanner to input raster data. The input raster data, for which the confirmation of resolution and the distortion correction are performed, is stored in an external medium such as a non-rewritable CD. At the same time, it is stored in a predetermined directory in the hard disk in a rewritable PC.

Next, color extraction is performed for every color tone. Points serving as markers are left at four places, for example, the four corners of the graphic frame.

The raster data is converted into two-color data for every color tone. The raster data is sorted into files for every color layer. All the colors other than the two colors in the sorted files are deleted. The files for every color layer are stored in the basic layers.

Creating the files for every color layer allows a large number of pieces of raster data to be sorted.

The following additional steps are executed depending on the objective of a data editing process.

In order to vectorize contours, first, the basic layer is displayed in the screen. The raster data of alphabetic information is converted into text data, and the raster data of the alphabetic information after the text conversion is deleted.

Next, the raster data excluding the alphabetic information is subject to batch conversion into short vectors. All the short vectors that are in contact with X and Y axes are automatically connected.

The automatically-connected polylines are stored in the element layers for every their elevation. For the elements stored in the layers, the color of the vector data in the basic layer is varied such that it is possible to determine that the vectorization is completed.

The layers are arranged for every element and, then, incomplete free curves or straight-lines (which are not in contact with the coordinate axes or which are incomplete after the deletion of the alphabetic information) are automatically connected by using an automatic-connection program between two points away from each other to form the polylines.

The elements formed into polylines are stored in the layers for every element.

For a cadastral survey, first, the basic layer is displayed in the screen. The raster data of alphabetic information is converted into text data, and the raster data of the alphabetic information after the text conversion is deleted.

Next, the raster data excluding the alphabetic information is subject to batch segmentation. The segments are transformed into closed loops (polygons) on the basic layer for every element, for example, for every site.

The elements transformed into the closed loops are sequentially sorted into specified element layers. The segments that are not to be or cannot be transformed into polygons are transformed into polylines for every element. For the elements stored in the layers, the color of the vector data in the basic layer is varied such that it is possible to determine that the transformation is completed. The areas of the elements transformed into the closed loops can be automatically measured and also can be linked to other information.

It is necessary to optimize each element in the data editing process in order to further reduce the amount of data.

First, the basic layer is displayed in the screen. The elements, such as letters, dimensions, or lines, are provided on the basic layer. The corresponding graphic frame is created for every floor or every object in a building.

Next, the following steps are executed depending on the elements. The files sorted for every color layer are converted for every element, such as a letter, straight line, or circle. The converted elements are synthesized for every object (a graphic or letter) and are inserted inside the graphic frame. After the insertion is completed, all the basic layers and the element layers are deleted.

Finally, the drawing is optimized for every element. Unnecessary histories, wrong inputs, and unnecessary elements are deleted. The amount of data of the optimized objects is drastically reduced. It is possible to convert the objects for other CAD software or to process them into data prepared for the CALS.

What is claimed is:

1. A method of digitizing graphic information comprising using a processor to perform the steps of:
   displaying a basic layer in a screen;
   converting raster data of alphabetic information into text data;
   deleting the raster data corresponding to the alphabetic information after the text conversion;
   performing batch conversion into short vectors for the raster data excluding the alphabetic information;
   automatically connecting the short vectors that are in contact with coordinate axes X and Y;
   storing the automatically-connected polylines in element layers; and
   arranging the layers for every element and automatically connecting incomplete free curves or straight-lines between two points away from each other to form the polylines.

2. A method of digitizing graphic information comprising using a processor to perform the steps of:
- converting raster data of alphabetic information into text data;
- deleting the raster data of the alphabetic information after the text conversion;
- performing batch segmentation for the raster data excluding the alphabetic information;
- transforming the segments into polygons;
- sequentially sorting the elements transformed into the closed loops into specified element layers; and
- transforming the segments that are not to be or cannot be transformed into the polygons into polylines for every element.

3. A method of digitizing graphic information according to claim 1, or 2, further comprising the step of sequentially optimizing the data.

4. A method of digitizing graphic information according to claim 3, wherein the optimizing step includes the step of deleting unnecessary histories.

* * * * *